United States Patent [19]
Kasai et al.

[11] Patent Number: 5,815,560
[45] Date of Patent: Sep. 29, 1998

[54] COMMUNICATION SERVICE CONTROL APPARATUS

[75] Inventors: Sadayo Kasai; Yoshihiro Kawanabe; Yoshikazu Takeda, all of Yokohama, Japan

[73] Assignee: Fujitsu Limited, Kanagawa, Japan

[21] Appl. No.: 483,546

[22] Filed: Jun. 7, 1995

[30] Foreign Application Priority Data

Jun. 8, 1994 [JP] Japan .................................. 6-126618
May 8, 1995 [JP] Japan .................................. 7-109759

[51] Int. Cl.⁶ ........................... H04M 15/00; H04M 7/00
[52] U.S. Cl. ........................... 379/114; 379/112; 379/157
[58] Field of Search ................................... 379/112, 114, 379/115, 116, 119, 120, 121, 127, 91, 201, 157

[56] References Cited

U.S. PATENT DOCUMENTS

| | | | |
|---|---|---|---|
| 5,003,584 | 3/1991 | Benyacar et al. | 379/119 |
| 5,381,467 | 1/1995 | Rosinski et al. | 379/114 |
| 5,517,559 | 5/1996 | Hayashi et al. | 379/115 |
| 5,524,142 | 6/1996 | Lewis et al. | 379/115 |
| 5,537,611 | 7/1996 | Rajagopal et al. | 379/115 |
| 5,568,541 | 10/1996 | Greene | 379/112 |

*Primary Examiner*—Curtis Kuntz
*Assistant Examiner*—Paul Loomis
*Attorney, Agent, or Firm*—Helfgott & Karas, P.C.

[57] ABSTRACT

The present invention relates to a communication service control apparatus for controlling communication services in the public network, private network or a network such as a virtual private network not accompanied by geographical conditions or physical conditions such as apparatus and more particularly to a communication service control apparatus for controlling the charging process for the communication services. The service control apparatus 2 comprises an information supply means 21 for supplying a charging control information including charging conditions about a plurality of customers for demanding the tariff of communication services, a charging decision means 22 for deciding, based on the charging control information, to charge for the predetermined customer among the plural customers, and a charging recording means 23 for recording charging result information based on the charging decision means. Therefore, according to the communication service control apparatus of the present invention, since the tariff demanding customers are determined when a communication service is executed, flexible charging can be realized and charging information can be concentrically controlled and managed.

12 Claims, 24 Drawing Sheets

Fig.22

| 1 | Tariff bill label | |
|---|---|---|
| 2 | Tariff bill number | |
| 3 | Date of generating the tariff bill | |
| 4 | Customer number | |
| 5 | Division of tariff | |
| 6 | Tariff bill number of the other divided bill | |
| 7 | Dividing condition | Exceeding limit value (17-7), Change of designated data (17-9), etc. |
| 8 | Code of the service control station (1-2) having conducted the processing | |
| 9 | Date of starting the communicationk | |
| 10 | Communication period | |
| 11 | Calling subscriber number | |
| 12 | Class of service | Automatica call, operator attendant call, conference call |
| 13 | Class of origination | General origination, data line, etc. |
| 14 | Trunk number | |
| 15 | Display of call condition | Normal end, test, irregular, etc. |
| 16 | Class of call | International incoming connection, international outgoing connection, domestic, etc. |
| 17 | Input number | |
| 18 | Conversion number | |
| 19 | Transfer number | |
| 20 | Termination number | |
| 21 | Additional service | |
| 22 | Tariff notification function: Provided, Not provided | |
| 23 | Total tariff notification function: Provided, Not provided | |
| 24 | Total tariff notification unit | Realtime, week, month, year, etc. |
| 25 | Tariff | |

PRIOR ART

COMMUNICATION SERVICE CONTROL APPARATUS

BACKGROUND OF THE INVENTION

1. Field of the Invention

The present invention relates to a communication service control apparatus for controlling communication services in the public network, private network or a network such as a virtual private network not accompanied by geographical conditions or physical conditions such as apparatus and more particularly to a communication service control apparatus for controlling the charging process for the communication services.

In these years, a plurality of domestic or international communication service companies have started to offer a variety of communication services. However, these communication services are offered to subscribers in the complicated manners because the procedures and tariff system to utilize these services are different from each other.

The networks which offer such multiplex communication services are expected easily enables subscribers to enjoy various services and to expand service area of network and application frequency and simultaneously to further improve the service level such as the concentrated management control of the charging process.

2. Description of the Related Art

FIG. 24 is a block diagram for explaining a general charging control system introduced in the ordinary telephone network. In FIG. 24, the reference numeral 101 denotes an exchange and 201 denotes a charging control apparatus.

As shown in FIG. 24, in the ordinary telephone network, each exchange 1 records and stores a telephone number of called subscriber, a telephone number of calling subscriber, communication period and time information of each call in the exchange operation when a call is terminated and simultaneously provides information about several calls as an output to the external charging and calculation center.

Calculation of tariff and determination of customer has been conducted at a time, for example, in the external charging and calculation center on the basis of an output information and subscriber information.

Namely, the tariff system, determination of customers, charging method and selection of routing are previously determined by the subscriber number of calling party or determined by the subscriber information or the codes inputted when a subscriber requests connection of call.

However, the method of related art explained above has a restriction, because information about tariff table and charging are dispersed in each exchange, that the tariff system, determination of customers, charging method and selection of routing are previously determined by the subscriber information or the codes inputted when a subscriber requests connection of call or conform to the method previously registered in the exchange. Moreover, the time and place for executing call connecting process and tariff calculation process have been isolated. With the reasons explained above, it has been impossible to control the charging method with the realtime conditions and to control the charging method with the subscriber's intention before the call connecting process.

SUMMARY OF THE INVENTION

It is therefore an object of the present invention to provide a communication service control apparatus which can flexibly control the charging method for each connection of call by concentrically control and managing the charging information.

In view of achieving the object explained above, an apparatus of the present invention comprises an information supply means for supplying a charging control information including charging conditions about a plurality of customers for demanding the tariff of communication services, a charging decision means for deciding, based on the charging control information, to charge for the predetermined customer among the plural customers, and a charging recording means for recording charging result information based on the charging decision means.

It is preferable that the information supply means has a location information for identifying accommodation location of subscribers to which the communication services are offered and a charging rule information for identifying the charging rule in such a case that the desired accommodation location is decided as the initial point of charging, while the charging decision means makes reference to the location information and the charging rule information and compares the charging rules with each other based on the accommodation locations of at least two or more subscribers among those to which the communication services are offered to decide any one of the subscribers compared as the initial point of charging.

It is also preferable that the information supply means has a customer information for identifying customers predetermined corresponding to the subscribers to which the communication services are offered and the charging decision means makes reference to the customer information to demand the charges for the communication service tariff to the predetermined customers.

FIG. 1 is a diagram for explaining the principle of the present invention.

In FIG. 1, the reference numeral 1 denotes an exchange which accommodates subscribers 4 to execute the exchange operation; 2, a communication service control apparatus for controlling the exchange 1 to offer the communication services requested by subscribers; 3, a virtual network offered for the subscribers accommodated in the exchange 1 through a private exchange 5; and 6, a public network for connecting each exchange 1 and communication service control apparatus 2.

In this specification, a public network includes a signal network for transmitting control signals between the exchanges 1 and a speech channel network for connecting communication paths between subscribers 4 (or exchanges 1) or an international public network having such functions.

The service control apparatus 2 comprises a information supply means 21, a charging decision means 22 and a charging recording means 23.

The information supply means 21 supplies a charging control information including charging conditions about a plurality of customers to whom the tariff for communication services requested by the subscribers should be demanded. Customers mean the subscribers to whom the tariff is demanded and are not always originating subscribers or terminating subscribers. A customer may be set freely for each subscriber and a plurality of customers may be designated for only one subscriber. It is of course possible to demand the charge only to an originating subscriber. Moreover, the charging control information means the information for determining to which customers the tariff is finally charged. Moreover, the information for determining how the charging is demanded to which customers in what kind of conditions is called the charging condition.

The charging decision means 22 makes reference to the above-mentioned charging control information to decide to charge for the predetermined customers among a plurality of customers on the basis of the predetermined charging condition.

The charging recording means 23 records the charging result information on the basis of determination by the charging decision means. As the charging result information, amount of money to be demanded for each customer, for example, is recorded every time the communication service is offered.

That is, the service control apparatus 2 utilizes these information supply means, charging decision means and charging recording means to charge the tariff generated by the communication services requested by the customers 4 to the customers determined depending on the predetermined condition. This charging information is recorded for each customer every time the communication service is offered and the tariff is demanded based on this charging information.

Therefore, according to the communication service control apparatus of the present invention, since the tariff demanding customers are determined when a communication service is executed, flexible charging can be realized and charging information can be concentrically controlled and managed.

The tariff demanding customers can be determined in the following steps.

(i) Automatic control charging

The terminating side having received a call from the exchange 1 presents the charging conditions on the basis of the accommodation location of the subscriber 4 in the originating side and the charging rule. For execution of communication services, comparison is made for the originating and terminating sides based on the accommodation locations and charging rule and any one of these originating and terminating subscribers is defined as the initial point of charging, the subscriber which results in a lower tariff is decided as the customer.

However, the accommodation location means an information for identifying the exchange, for example, to accommodate subscribers and can be used as the information to identify the area in which a subscriber is located. For example, when a communication service between the subscribers located in different countries is considered, if unit price is compared in the same time duration, the subscriber which results in lower cost may be changed due to change of the exchange rate. That is, such change of subscriber may be reflected on determination of customer by comprising a means for supplying the exchange rate changing information on the realtime basis within the communication service apparatus.

Meanwhile, the charging rule means a tariff system of a unit price of the communication service when a certain subscriber is defined as the initial point of charging. The charging rule is capable of including information about discount hours. For example, a subscriber in such a side as can be accepting the discount service may be determined as the initial point of charging from the time duration in the charging time. It is naturally possible to determine the customers in combination with the exchange rate changing information explained above.

Determination of customers and charging thereto with the method explained above is hereinafter called the automatic control charging.

(ii) Customer control charging

Customers are determined depending on the information inputted from subscribers 1 who has requested communication services. The information inputted by subscribers may preferably be a service access code which is inputted when communication services are requested.

Moreover, the subscribers may previously register a plurality of customers and can freely select the desired customers by designating service access codes. In addition, it is also possible to establish the condition that tariff is shared to a plurality of customers in the predetermined ratio. Determination of customers and charging to these customers by the method explained above is hereinafter called the customer control charging.

(iii) Flexible charging

In the case where subscribers who have registered customers for the customer control charging have requested application of the automatic control charging, any charging method may be selected and executed depending on the predetermined condition. That is, any one charging method having higher priority can be selected by previously determining the priority, for example, which indicates the application priority of charging method to each subscriber. As a result, it is now possible to realize complicated charging control through multiple combination of the automatic control charging and customer control charging.

Determination of customers and charging to these customers by the method explained above is hereinafter called the flexible charging.

Determination of customers by the methods explained in the items (i) to (iii) enables decision of charging objects considering the unit price in charging which changes from time to time depending on the area in which the subscribers are located and date of charging such as discount time duration service and international exchange rate, etc., as well as situations of subscribers.

BRIEF DESCRIPTION OF THE DRAWINGS

FIG. 22 illustrates an example of contents of a bill in the flexible charging system.

DESCRIPTION OF THE PREFERRED EMBODIMENTS

A preferred embodiment of the present invention will then be explained with reference to the accompanying drawings.

In the preferred embodiment of the present invention, a structure of a service control station corresponding to a communication service control apparatus in the present invention will be explained first and a control flow in the service control station will then be explained in detail.

[1] Service control station

Figure 2:
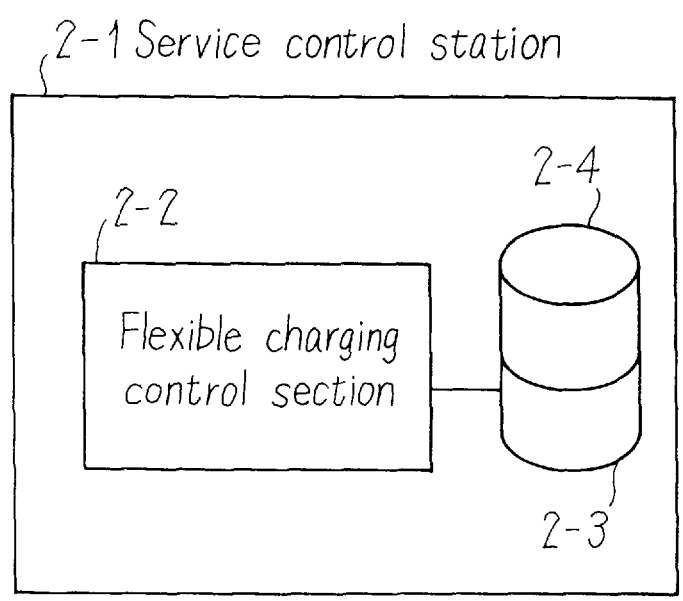
FIG. 2 to FIG. 5 illustrates examples of structure of the service control station.

FIG. 2 illustrates an example (1) of structure of the service control station.

Figure 1:
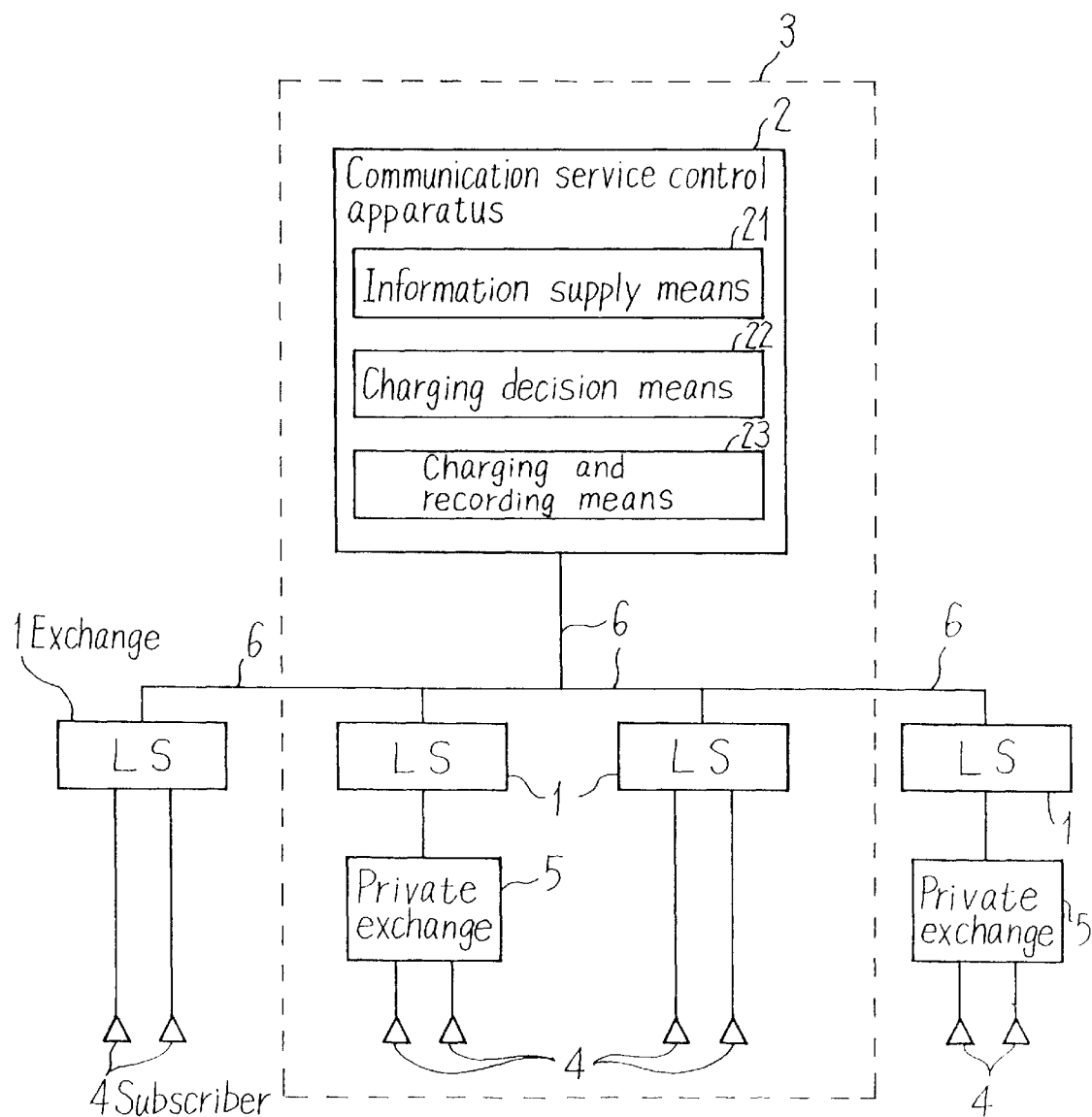
FIG. 1 is a diagram for explaining the principle of the present invention.

A service control station 2-1 in FIG. 2 indicates a profile of the communication service control apparatus 2 in FIG. 1 and a structure of the public network 6 connected to the apparatus 2 is deleted.

The service control station 2-1 comprises a flexible charging control section 2-2 and a database.

The database comprises a detail charging and calculation information section 2-3 corresponding to the information supply means 21 and a charging information section 2-4 corresponding to the charging recording means.

The detail charging and calculation information section 2-4 is composed of a tariff table based on the tariff system of communication service companies to which each exchange connected to the service control station 2-1 belongs, a charging mode registration database (explained later) which may be registered for each subscriber, financial rate/dime difference determination database (explained later), a routing number determination database (explained later), a tariff table determination database (explained later) and a customer/sharing ratio determination database, etc. with inclusion of information which is necessary for calculation of detail charging for each call.

The charging information section 2-4 is constituted so that the communication recording information of every calls is accumulated to accumulate the information about detail contents of tariff of a generated bill (explained later).

The flexible charging control section 2-2 corresponds to the charging decision means of FIG. 1. The flexible charging control section 2-2 determines, for continuation of the relevant communication services, whether charging should be demanded to any one of the originating side and terminating side, depending on the predetermined control flow, using the information obtained with reference to the detail charging and calculation information section 2-3 corresponding to the communication service request from the subscribers.

A communication service requested from a customer may be the service in which the charging object explained above is determined by the service control station and ordinary line connections only are executed, or may be the service in which after the charging object is determined, the other well known communication service is executed.

In addition, it is also possible to inform that the tariff may be demanded to a subscriber who will become the customer before or after execution of the other communication services mentioned above in view of urging the answer for acceptance or no-acceptance.

Figure 3:
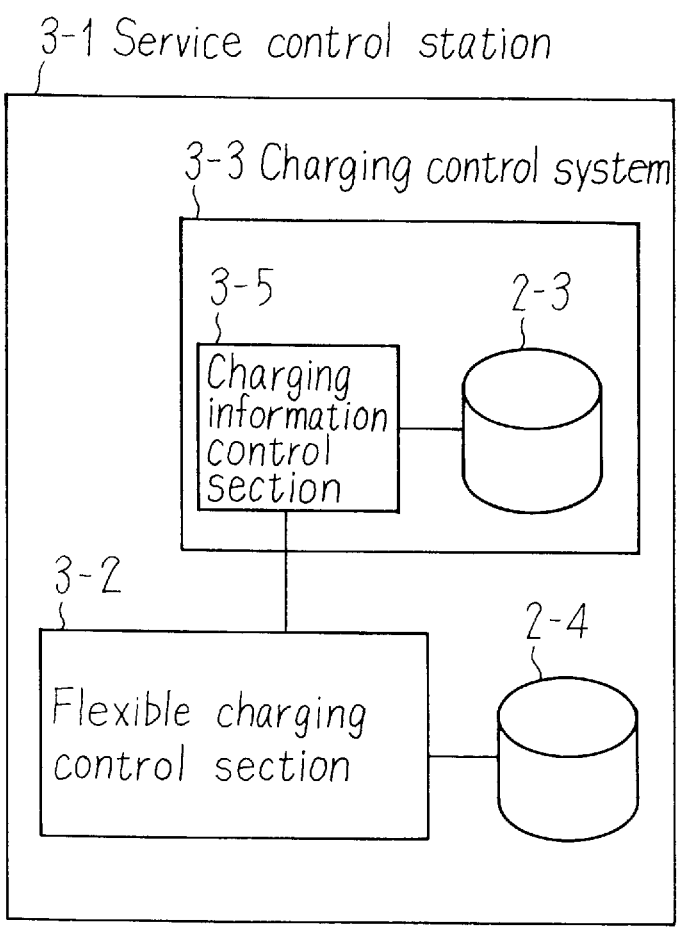

FIG. 3 illustrates an example (2) of the service control station.

A service control station 3-1 in this figure indicates another profile of the communication service control apparatus in FIG. 1.

The service control station 3-1 and the service control station 2-1 in FIG. 2 are respectively constituted to provide the detail charging and calculation information section 2-3 and the charging information section 2-4 of database in the different apparatuses.

The service control station 3-1 is different from the structure shown in FIG. 2 in such a point that it is provided with the charging control system 3-3 comprising the charging information control section 3-4 for updating the information in the charging information section 2-4 depending on the request from the flexible charging control section 3-2, but is almost similar to the structure explained in regard to the other operations.

That is, a more variety and a larger amount of control data may be stored and more complicated flexible charging control processing can be realized by isolating the flexible charging control section 3-2 from the charging control system 3-3 in the service control station 3-1 for controlling the charging for the other communication service calls.

Introduction of such structure makes lesser the influence on the processing capability of the service control station which executes the other charging processes, etc. and enhances safety of data in both sides.

Figure 4:
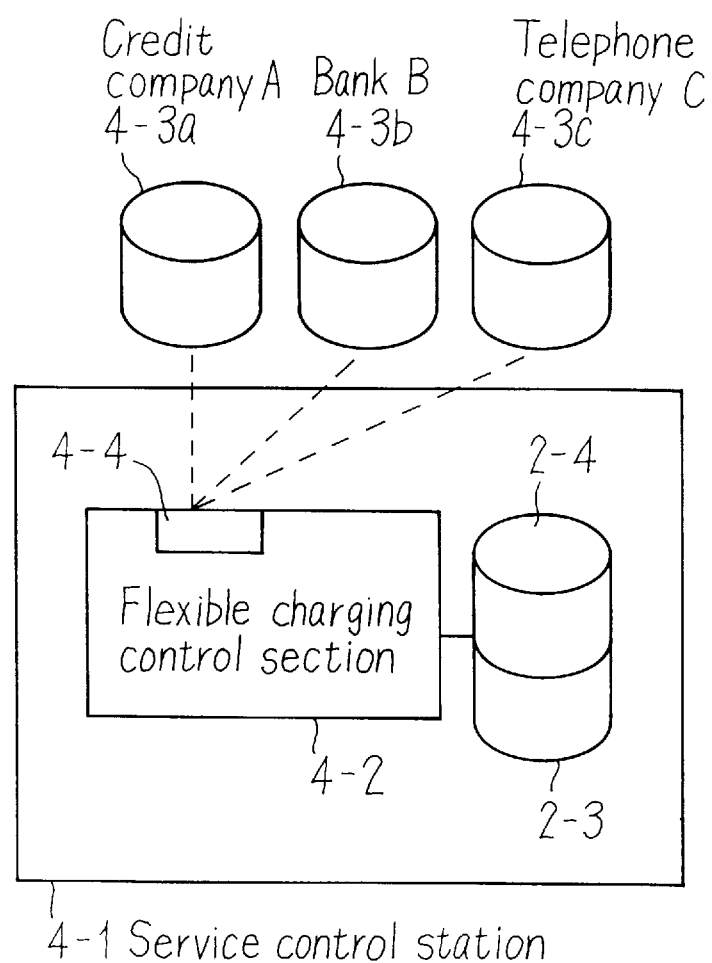
Figure 5:
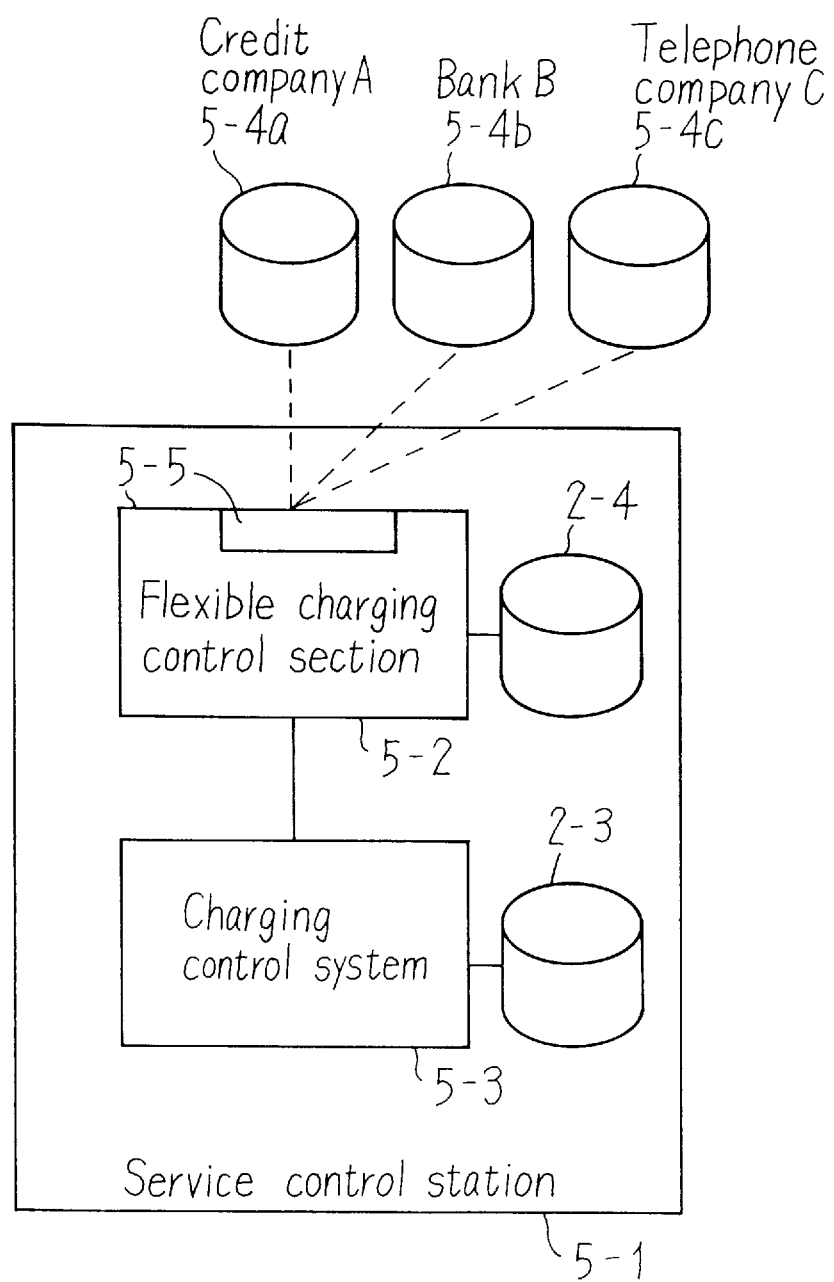

Moreover, as shown in FIG. 4 and FIG. 5, external data access sections 4-4, 5-5 for making access to external database for making reference to the information required for charging may be provided as a complementary means of the detail charging information section 2-4 (not illustrated) in the flexible charging control sections 4-2, 5-2 in FIG. 2 and FIG. 3.

That is, the flexible charging control processing having a higher grade of realtime performance can be realized by making reference, for example, to the data such as exchange rate and tariff table, etc. which are stored or managed in the external databases such as those of banks and other companies, etc.

[2] Control Flow

The control flow in the service control station will then be explained hereunder with reference to the drawings and tables. The control flow explained hereunder may also be applied in the service control station having any structure shown in FIG. 2 to FIG. 5.

[2.1] Determination of flexible charging mode

An operating condition for selecting and executing any one of the automatic control charging or customer control charing in the service control station explained above, is called the flexible charging mode.

Figure 6:
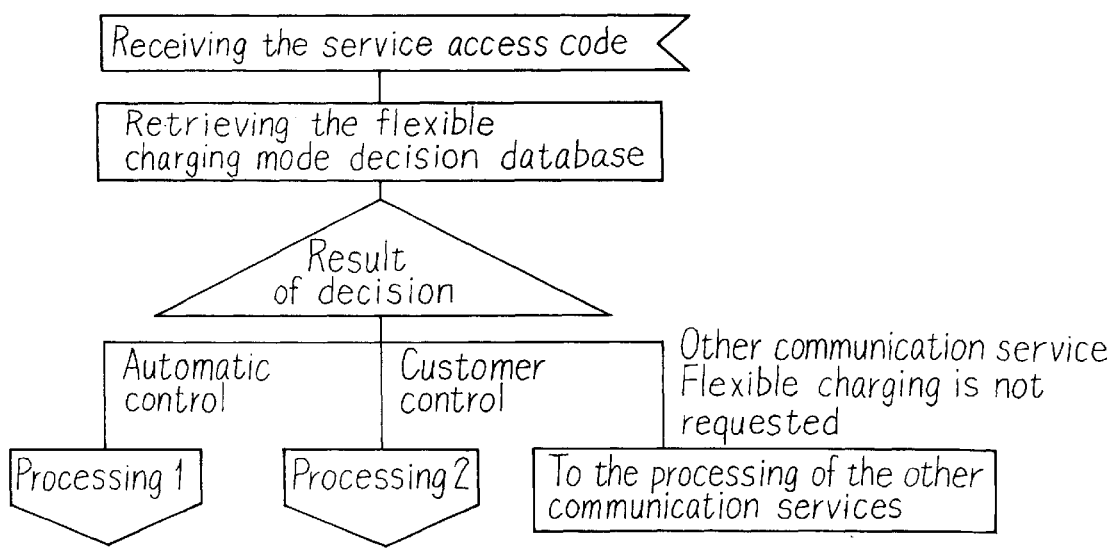
FIG. 6 illustrates an example (1) of the control flow for determining the flexible charging mode.
Figure 7:
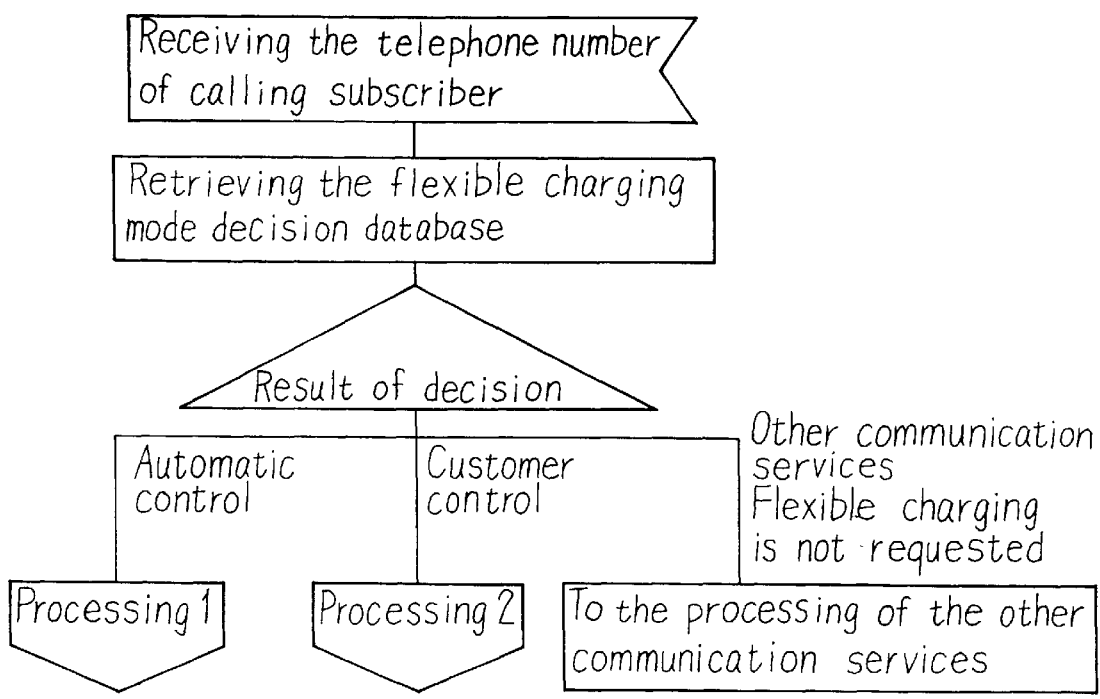
FIG. 7 to FIG. 10 illustrate the examples (2) to (5) of the control flow for determining the flexible charging mode.
Figure 8:
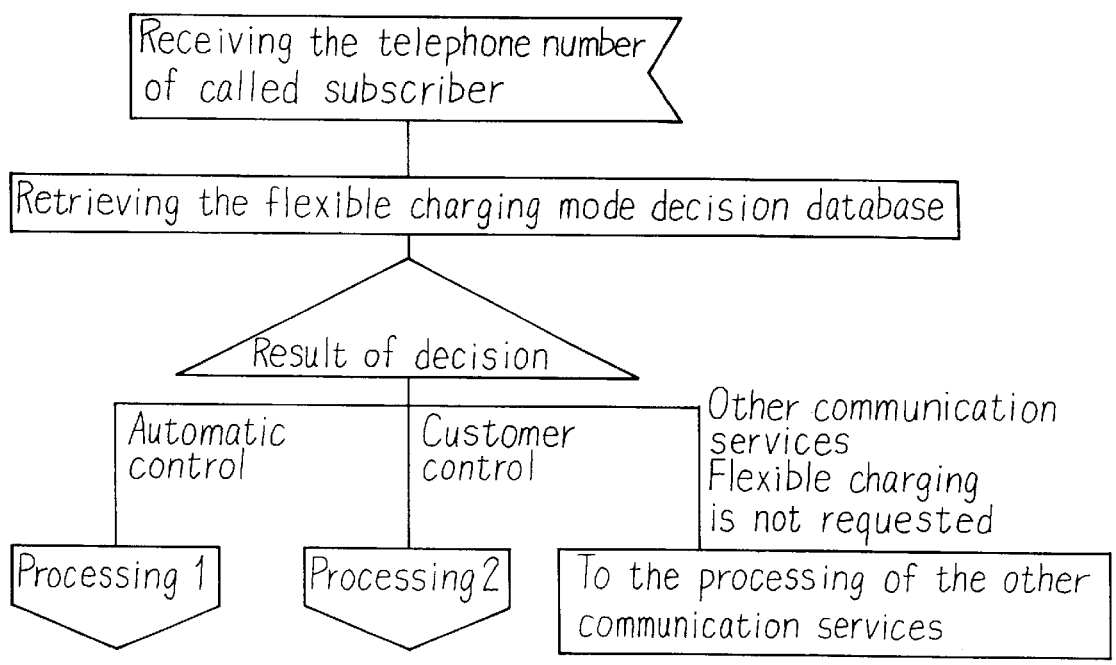
Figure 9:
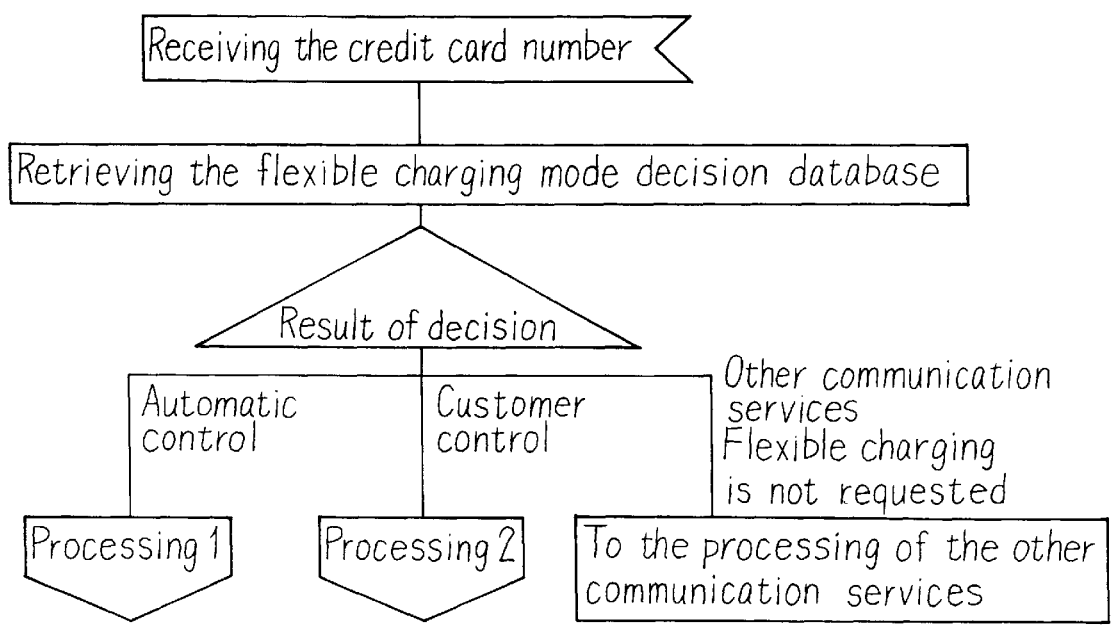
Figure 10:
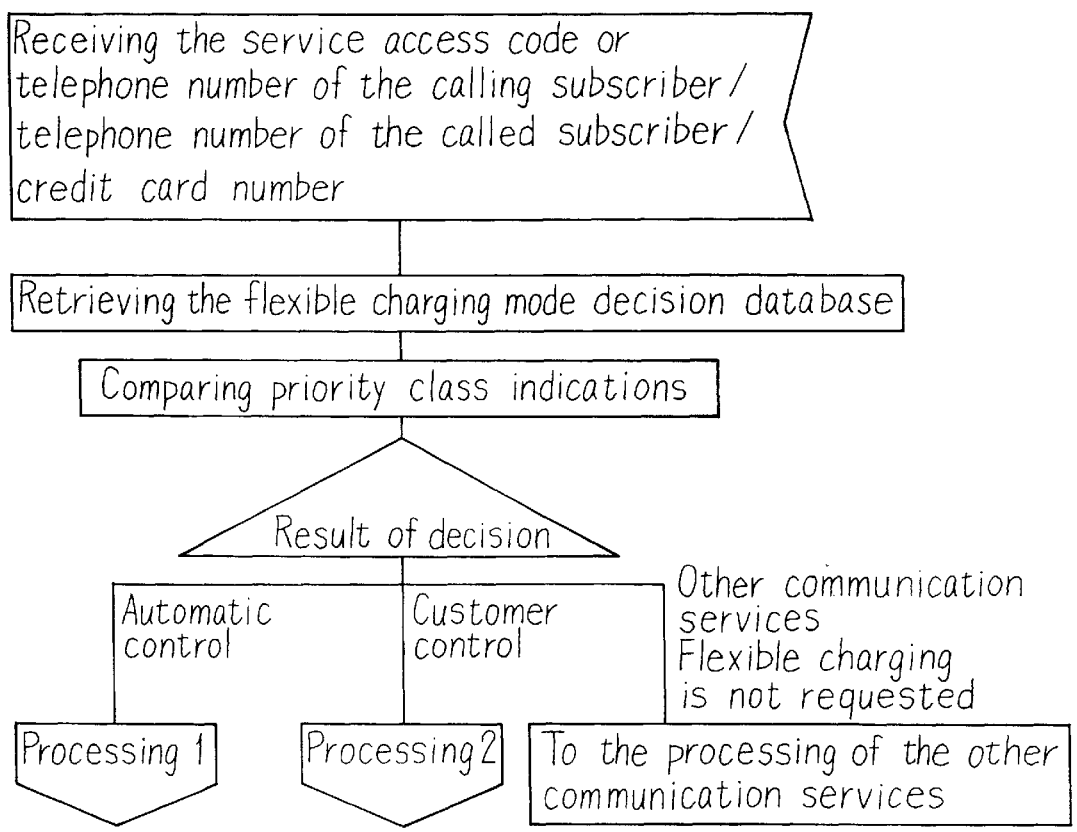

FIG. 6 illustrates an example (1) of the control flow for determining the flexible charging mode.

Upon reception of a service access code which is inputted from a subscriber for requesting the communication service, the service control station retrieves a decision database (not illustrated) using the service access code as the key in order to decide which communication service is requested. When the relevant communication service is decided as the execution object of the automatic control or customer control, the processing 1 and the processing 2 are executed, respectively. When the requested communication service does not correspond to any controls and it can be found as the starting request for the other communication services, the processing skips to the processing for executing the relevant communication service.

Figure 16:
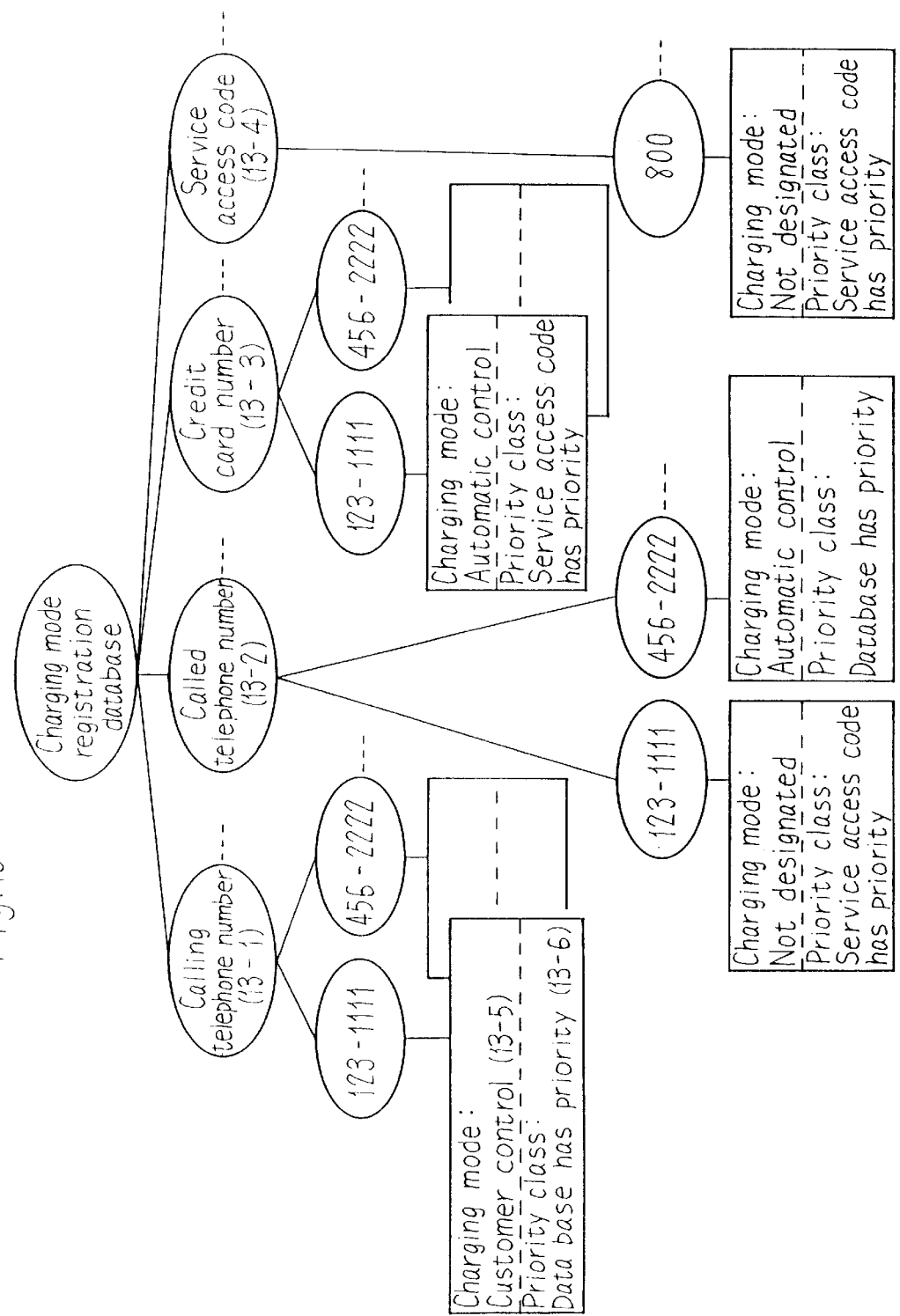
FIG. 16 illustrates an example of structure of the flexible charging mode decision database.

FIG. 16 illustrates an example of structure of the flexible charging mode decision database. The flexible charging mode decision database is structured as the object database to obtain the charging mode (13-5) and priority class (13-6) by making retrieval with the telephone number of the calling party (13-1), telephone number of the called party (13-2), credit card number (13-3) and service access code (13-4), etc. used as the key.

For instance, the retrieval is conducted by inputting [1231111] to the database with the telephone number of calling party (13-1) used as the key, the resultant charging mode (13-5) is [customer control]. In this case, since the priority class (13-6) is [database priority], the customer control charging may be executed without relation to the service access code of the subscriber.

Moreover, when the retrieval is made by inputting [800], for example, with the service access code (13-6) used as the key, since the charging mode is [not designated] and the priority class is [service access code priority], charging is performed depending on the service access code inputted by the subscriber.

That is, if the communication service designated by the service access code [800] is the line connection for which all tariff is demanded to the called subscriber, the processings of the automatic control charging and customer control charging are not performed and charging for all tariff is demanded to the subscriber called subscriber as the intrinsic charging processing of the relevant communication service.

Table 1 is the table indicating an example of the service access codes for controlling the charging inputted by a subscriber when the subscriber requests the communication services.

A subscriber inputs, for requesting a communication service, the service access code indicated in the table 1 to the exchange.

[TABLE 1]

List of Charging Control Codes

| Charging control code | Contents |
| --- | --- |
| 500 | Requesting flexible charging |
| 501 | Requesting automatic control mode |
| 502 | Requesting customer control mode |
| 503 | Requesting change of customer registration |
| 800 | Communication service Y |

The service control station retrieves the flexible charging mode decision database shown in FIG. 16 using the inputted service access code as the key and decides, for each call, which is to be used among the flexible charging function and charging mode depending on the result of decision.

FIG. 7 to FIG. 10 illustrate the examples (2) to (5) of the control flow for determining the flexible charging mode.

In addition to the control explained above using the service access code for controlling the charging inputted by the subscriber, it is also possible that the flexible charging mode decision database is retrieved using a subscriber number of the calling subscriber (telephone number of calling subscriber) or subscriber number of the called subscriber (telephone number of called subscriber) or credit card number which are previously registered in the database of the service control station and the flexible charging mode is determined depending on the result of decision. Moreover, it is also possible to previously define that the charging mode derived from which element among the service access code for controlling the charging, telephone number of calling subscriber or telephone number of called subscriber should be decided first with priority.

With the control explained above, the service control station can decide the charging mode for each call for the charging to the communication services requested by the subscriber. When the charging mode is decided, the automatic control charging or customer control charging is executed depending on the determined charging mode under the control explained in the next paragraph.

[3] Automatic control charging

The control flow for executing the automatic control charging will then be explained.

The automatic control charging is a function to automatically determine the charging method which will provide the lowest tariff to the predetermined subscribers in such communications as connecting a plurality of countries or running organizations.

The service control station can select the charging method which provides the lowest tariff from the methods listed below.

1) Tariff specially determined for day and time
2) Tariff determined for class calls (automatic call/attendant call, conference call, etc.)
3) Tariff determined for class of services
4) Tariff determined for running organizations
5) Private line
6) Exchange rate In this embodiment, following three databases are provided for determining the charging method.

Figure 17:
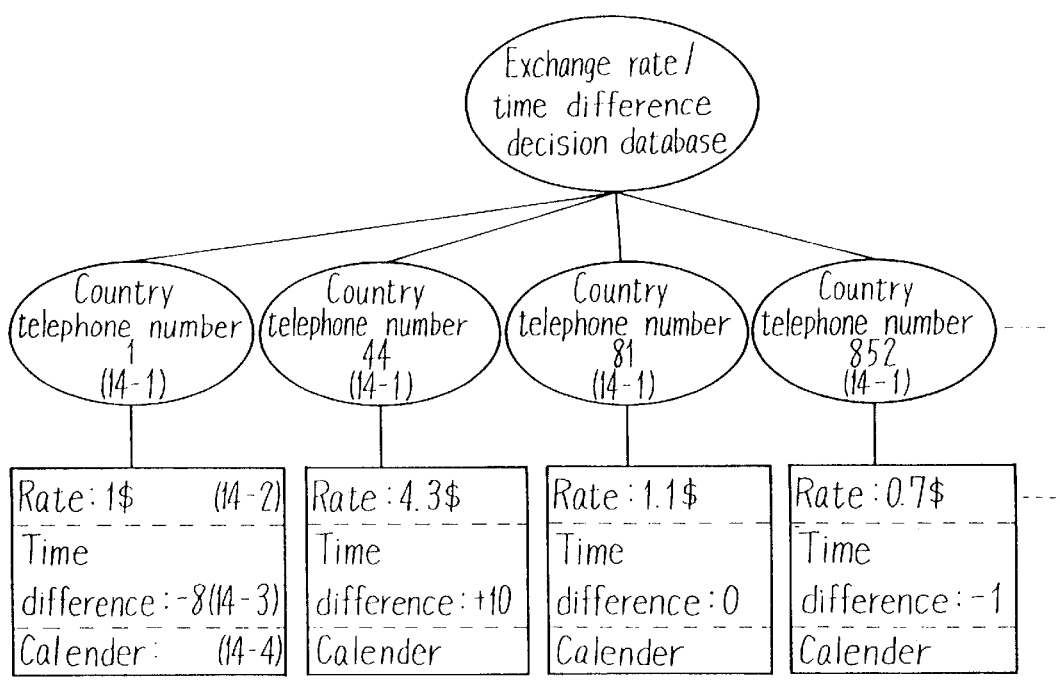
FIG. 17 illustrates an example of structure of the exchange rate/time difference determination database.
Figure 18:
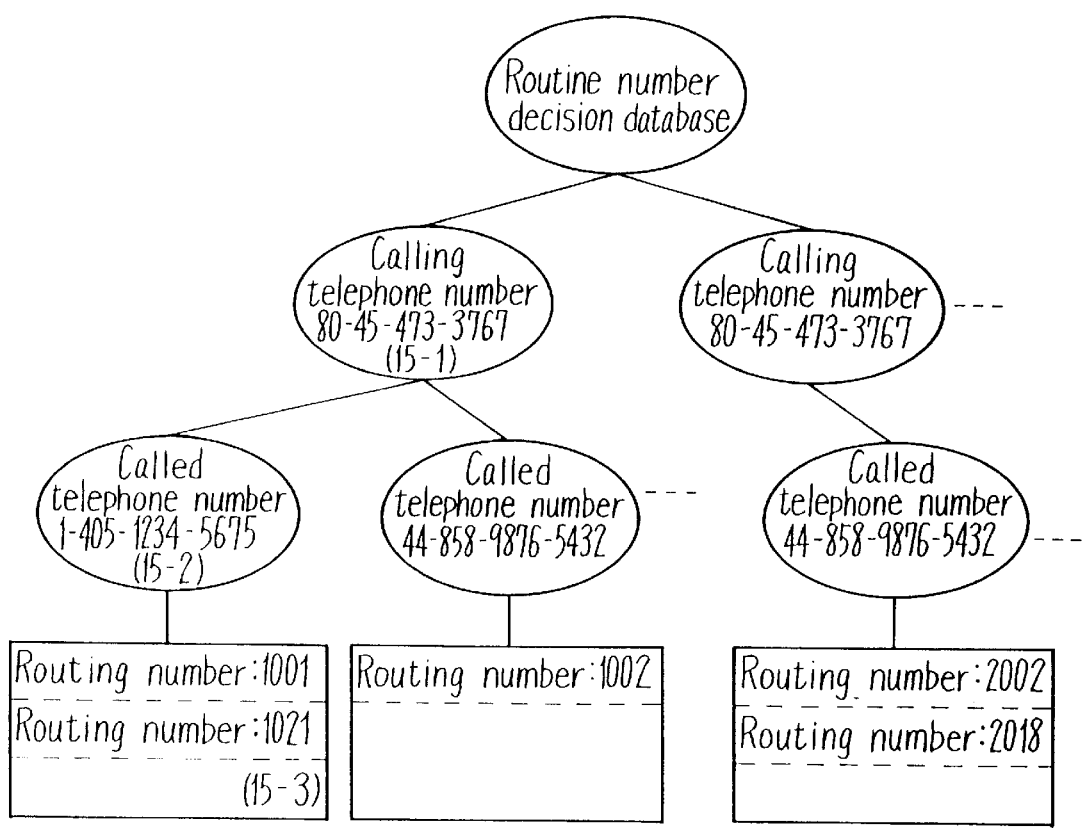
FIG. 18 illustrates an example of structure of the routing number determination database.
Figure 19:
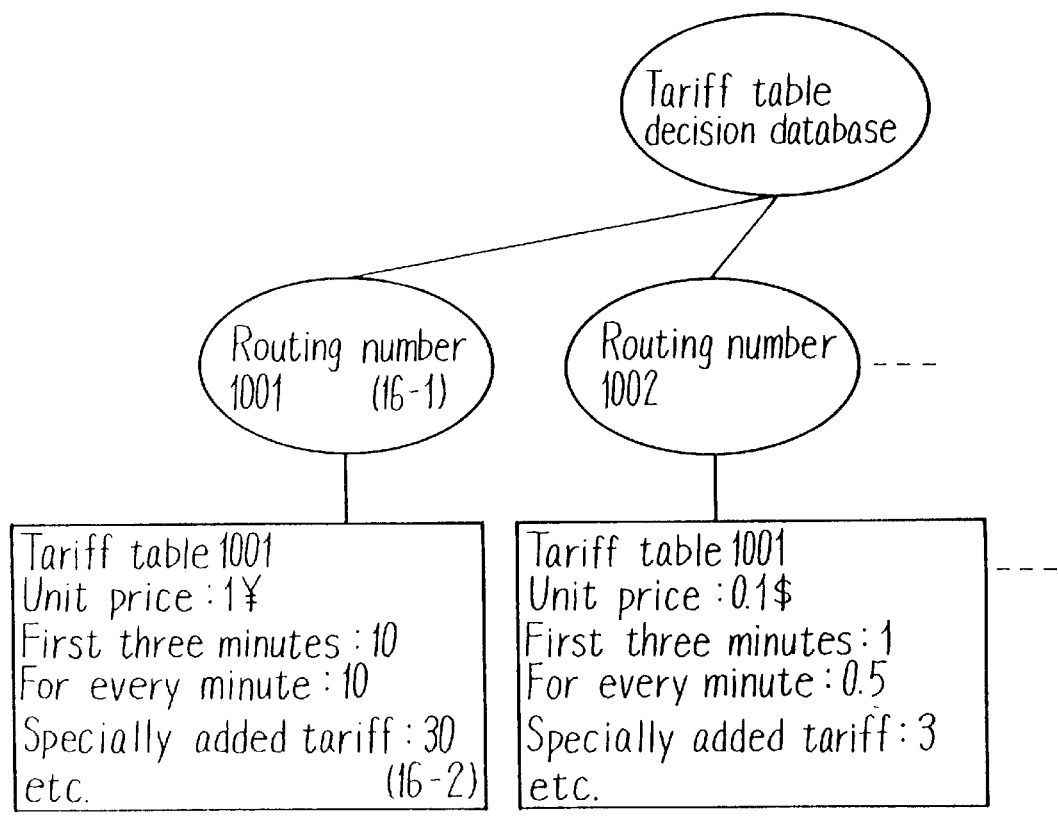
FIG. 19 illustrates an example of structure of tariff table determination database.

FIG. 17 illustrates an example of structure of the exchange rate/time difference determination database. FIG. 18 illustrates an example of structure of the routing number determination database. FIG. 19 illustrates an example of structure of tariff table determination database.

First, the routing number determination database as shown in FIG. 18 is provided using the telephone numbers of the calling subscribers and called subscribers as the objects. As its output result, the tariff calculation information associated with the telephone numbers of calling subscribers (time difference, additional telephone services, to which the calling subscribers belong, requiring a special tariff, etc.) and tariff calculation information associated with the telephone numbers of called subscriber (least cost routing number, time difference, etc.) are set previously.

The tariff table determination database as shown in FIG. 19 using the routing number as the object is also provided. As its output result, a telephone tariff table (for first three minutes, each minute after first three minutes, additional tariff and discounted tariffs for time and day, etc.) is previously set.

Moreover, the exchange rate/time difference determination database shown in FIG. 17 using the termination countries as the objects is also provided. As its output result, time difference and exchange rate of each country are previously set.

Figure 11:
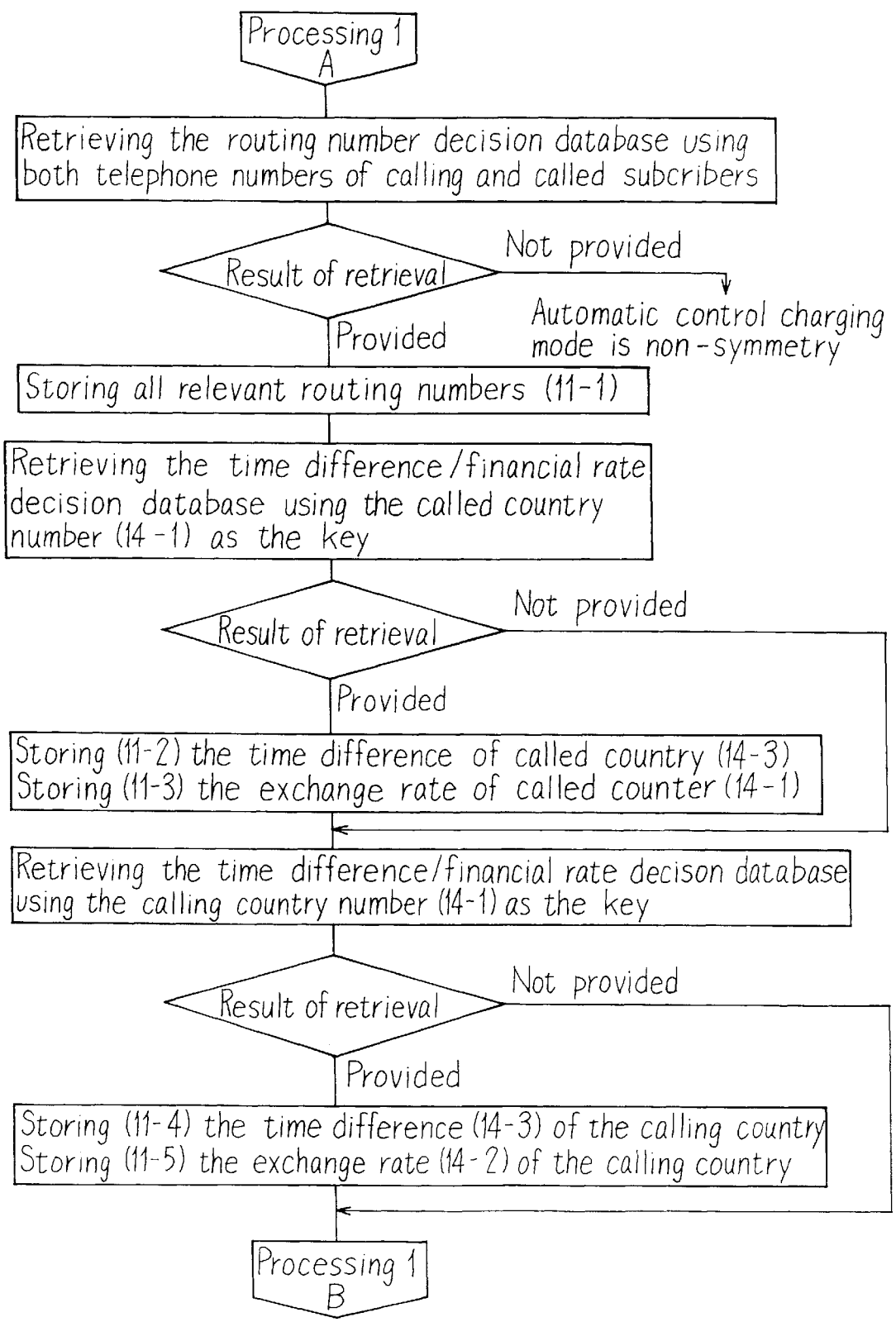
FIG. 11 and FIG. 12 illustrates examples of the control flow for executing the automatic control charging.
Figure 12:
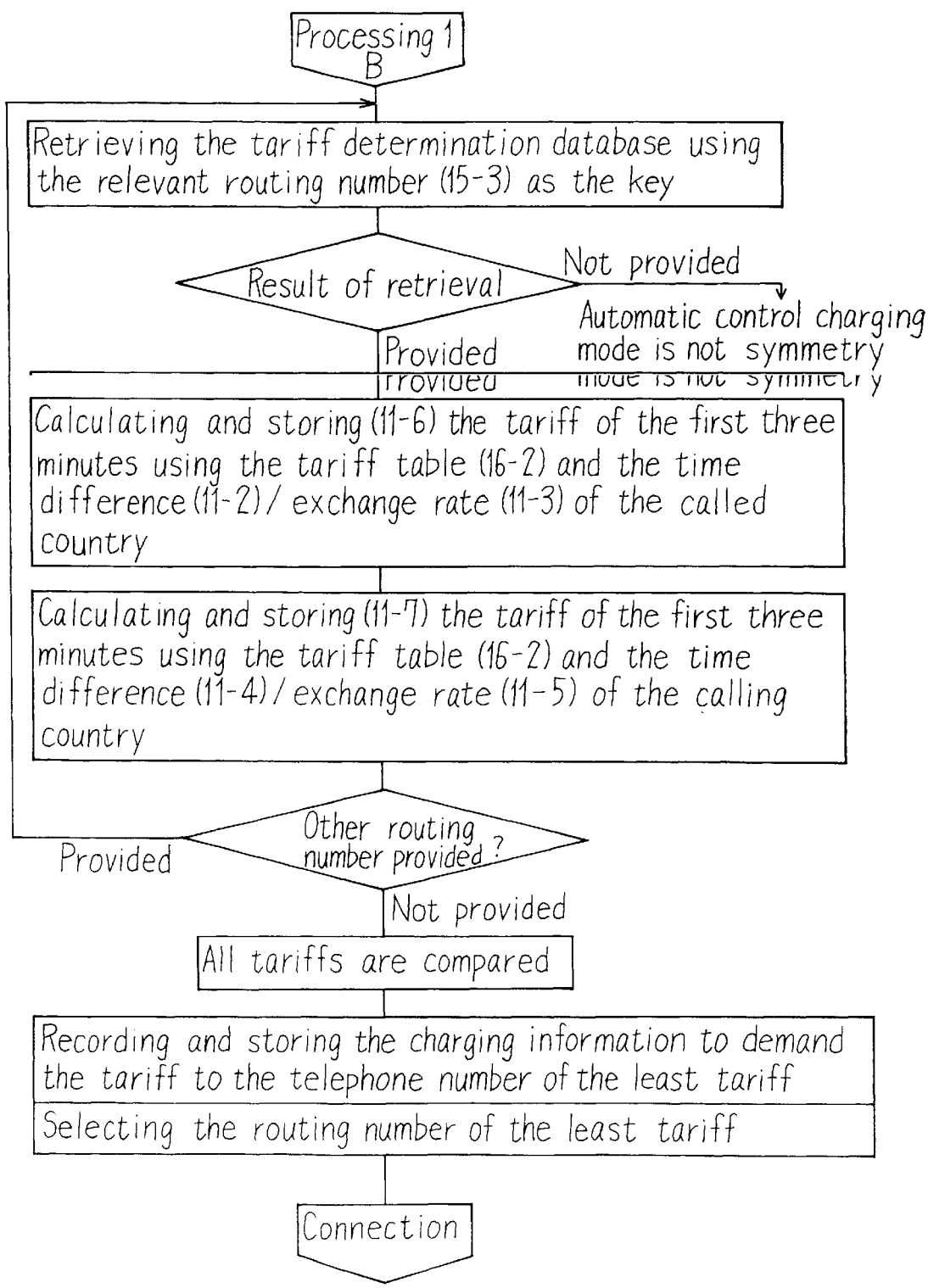

FIG. 11 and FIG. 12 illustrates examples of the control flow for executing the automatic control charging.

The flexible charging control section of the service control station automatically determines the charging method with the control explained below to generate bills for adequate charging to the subscribers. The control flows of FIG. 11 and FIG. 12 will be explained hereunder.

First, the routing number determination database is retrieved with the telephone number of called subscriber received from the exchange used as the key. When the telephone number of called subscriber exists actually, the tariff determination information (least cost routing number (3.2.1) associated with the telephone number of called subscriber and time difference (3.2.2), etc. can be obtained. Moreover, the tariff determination database is then retrieved with the routing number obtained as the least cost routing number used as the key. When the routing number exists actually, the telephone tariff table (for first three minutes, each minute after first three minutes, additional tariff and discounted tariffs for time and day, etc.) may be obtained. Furthermore, the exchange rate/time difference determination database is retrieved with the called country number used as the key. When the called country number exists actually, the exchange rage information (5.1) of the called country can be obtained. The telephone tariff in charging for the telephone number of called subscriber is calculated from the tariff determination information (3.2) associated with the telephone number of called subscriber, telephone tariff table (4.1) and exchange rate information (5.1) and the result is stored.

Subsequently, the routing number determination database is retrieved with the telephone number of calling subscriber used as the key. When the telephone number of the calling subscriber exists actually, the tariff determination information (time difference (3.1.1), additional telephone service (3.1.2) to which the calling subscriber belongs) associated with the telephone number of calling subscriber may be obtained. The telephone tariff for charging to the telephone number of calling subscriber is calculated from the tariff determination information (3.1) associated with the telephone number of calling subscriber and telephone tariff table (4.1) and the result is stored. The telephone tariff table (4.1) is the information corresponding to the charging rule explained previously.

Moreover, the exchange rate/time difference determination database is retrieved with the calling country number used as the key. When the calling country number exists actually, the exchange rate information (5.1) of the calling country may be obtained. The telephone tariff for charging to the telephone number of calling subscriber can be calculated from the tariff determination information (3.2) associated with the telephone number of calling subscriber, telephone tariff table (4.1) and exchange rate information (5.1) and the result is stored.

The customer is determined so that the tariff in charging to the telephone number of calling subscriber and the tariff in charging to the telephone number of called subscriber are compared and charging is demanded to the telephone number of lower tariff.

FIG. 22 illustrates an example of contents of a bill in the flexible charging system.

The flexible charging control section generates, for example, a flexible charging bill as shown in FIG. 22 based on the determined result mentioned above. The generated bill may be sent to the customer when it has been generated or may also be sent at a time as a set of those generated in the predetermined period.

If the calling/called telephone numbers and calling/called country numbers do not exist in the database, the ordinary charging method should be employed.

With the control as explained above, the charging method which automatically provides the lowest tariff can be determined. In regard to the information which changes from time to time such as the international exchange rate, above decision can be made based on the latest information by making access, as required, to the external databases.

[4] Customer control charging

The customer control charging is a function which allows the subscribers to freely designate the tariff charging method. This customer control charging function will then be explained hereunder in detail.

According to the control explained hereunder, the flexible charging control section of the service control station flexibly selects the charging system for each call or decides the charging objects depending on the request from the subscribers in view of recording the communication service tariff such as communication tariff in various manners.

[4.1] Charging system designating means

A subscriber can designated the charging system depending on the following designation method.

First of all, as the charging system designation means depending on the data in the calling subscriber side, any one or both of
1) previous registration to the service control station
2) determination with an input operation by a calling subscriber for each connection may be employed.

Moreover, the charging method designation means depending on the data in the called subscriber side is previously registered in the service control station.

[4.2] Designation of customer

As the customers, following may be considered.
1) Telephone number of calling subscriber
2) Telephone number of called subscriber
3) Telephone number of the third party
4) Telephone number of a proposer in the conference call
5) Telephone number of an attendant of the conference call
6) Accounting number in the bank The means for designating the customer is as follow. A calling subscriber inputs any number among those listed above or inputs the designated code corresponding any one of these numbers from a telephone set. Thereby, the flexible charging control section of the service control station converts the input code into any customer number in order to select the customer.

[4.3] Divided tariff designation

The divided tariff designation is possible by the following methods.
1) Any plurality of items 1) to 6) listed above are designated as the customers for divided tariffs.
2) The tariff division ratio to a plurality of customers is freely designated to each designated customer.
3) If division is impossible, only one customer is designated with additional designation for division ratio of 100%.

[4.4] Means for realizing determination of charging system and customer

Figure 20:
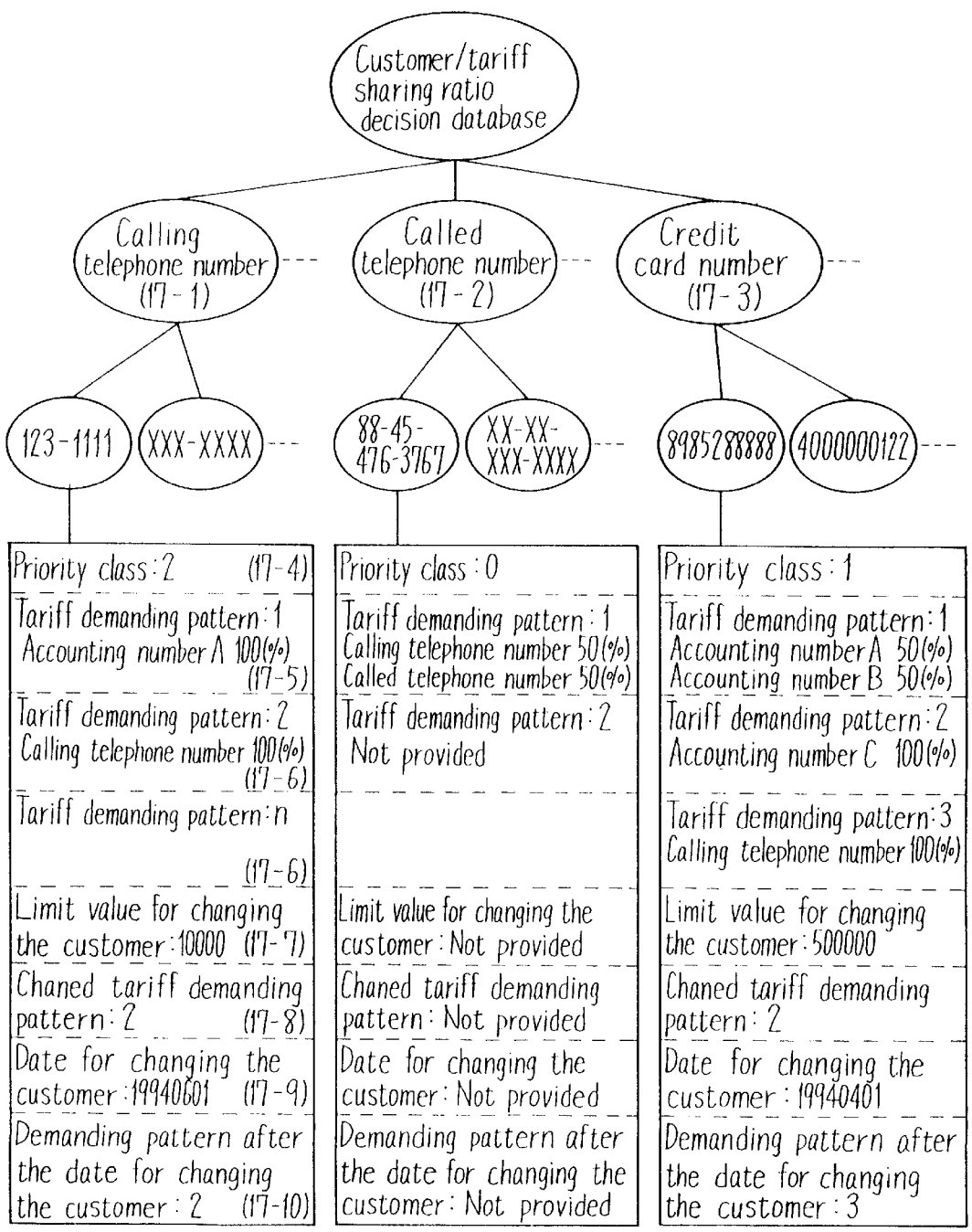
FIG. 20 illustrates an example of structure of the customer/tariff sharing ratio determination database.

FIG. 20 illustrates an example of structure of the customer/tariff sharing ratio determination database.

For determination of charging method and customers, the customer/tariff sharing ratio determination database as shown in FIG. 20 is provided with the telephone number of the calling subscriber and telephone number of the called subscriber used as the keys. As its output result, the customers and tariff sharing ratio are previously set.

Figure 13:
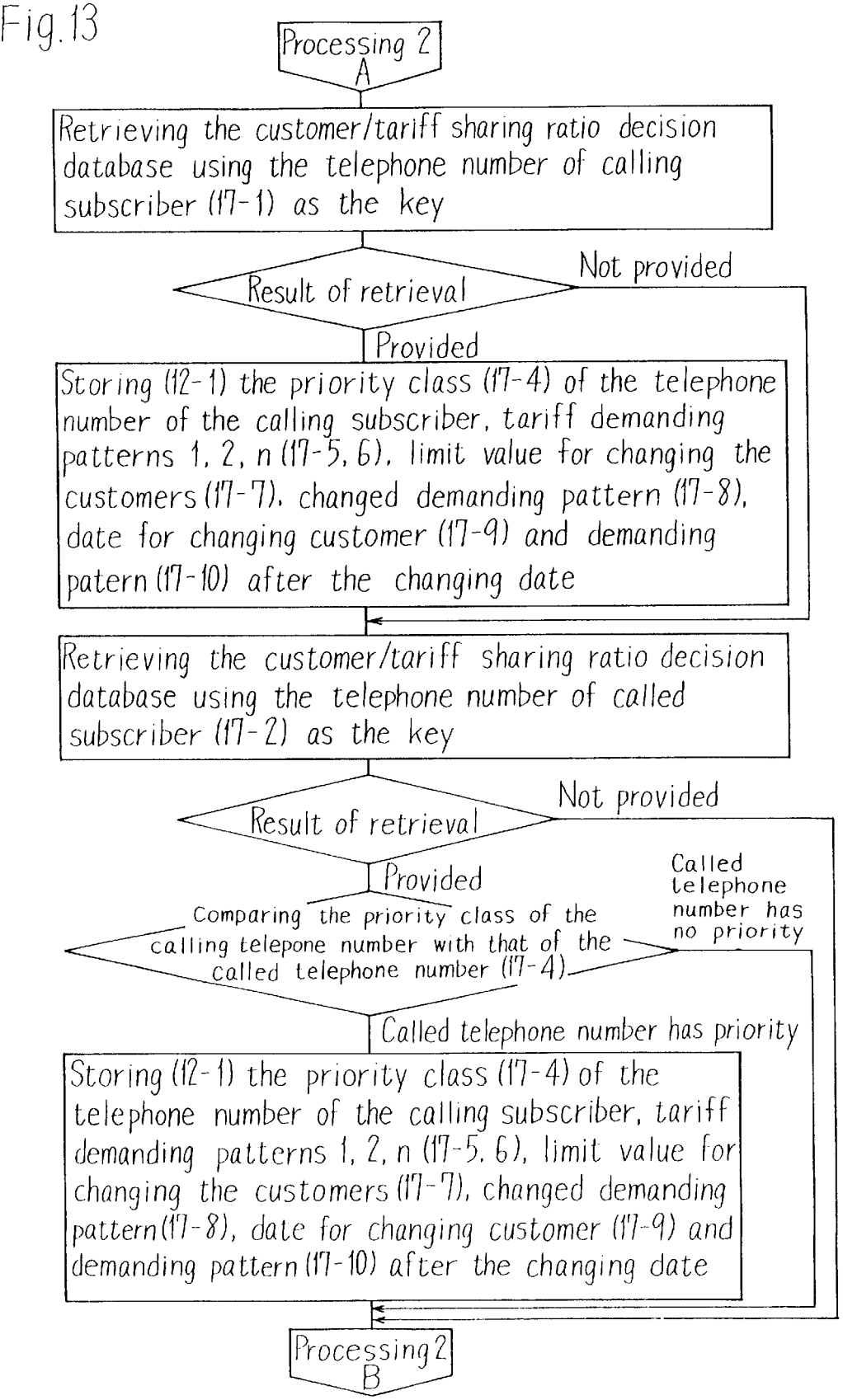
FIG. 13 to FIG. 15 illustrate examples of the control flow for executing the customer control charging.
Figure 14:
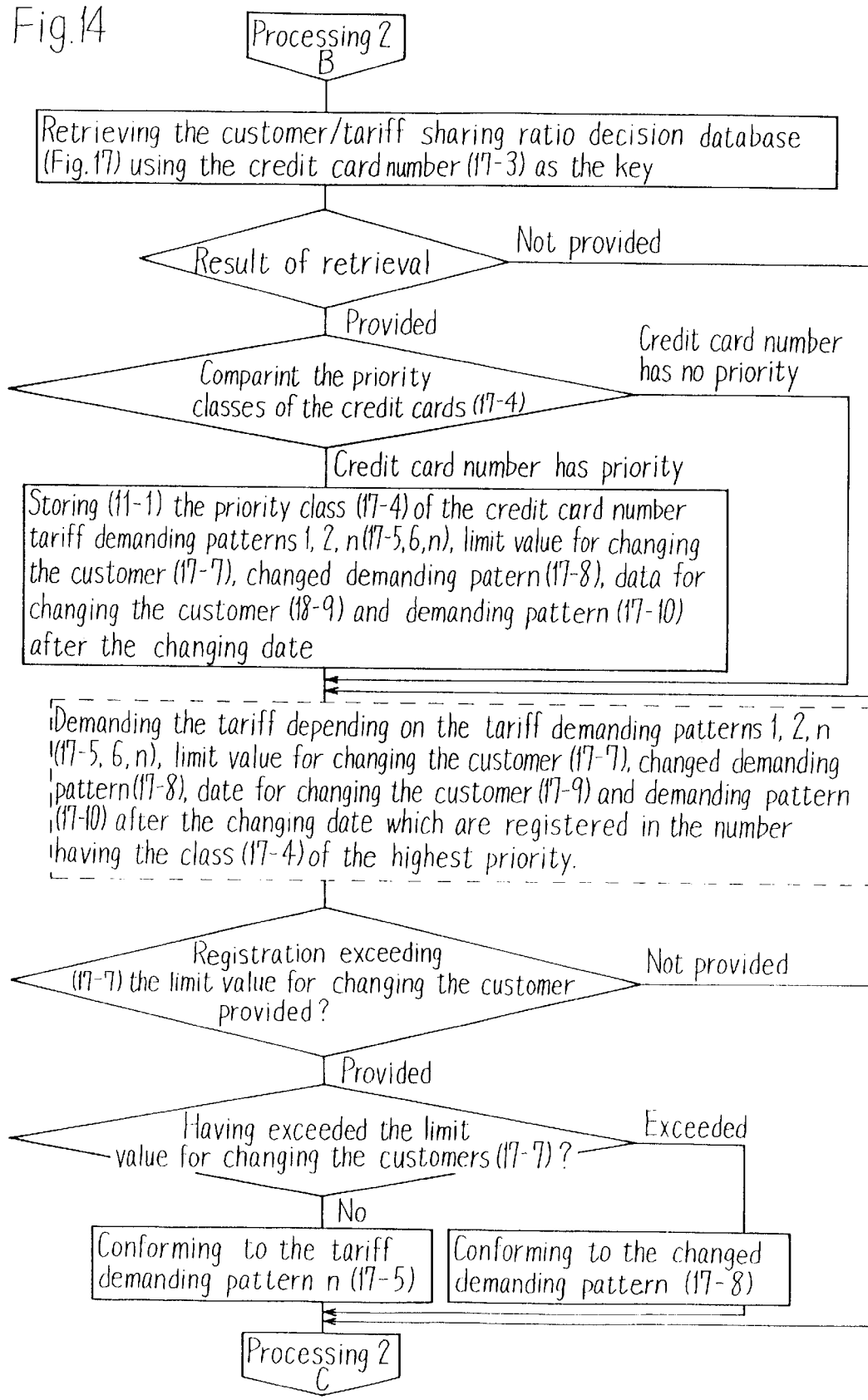
Figure 15:
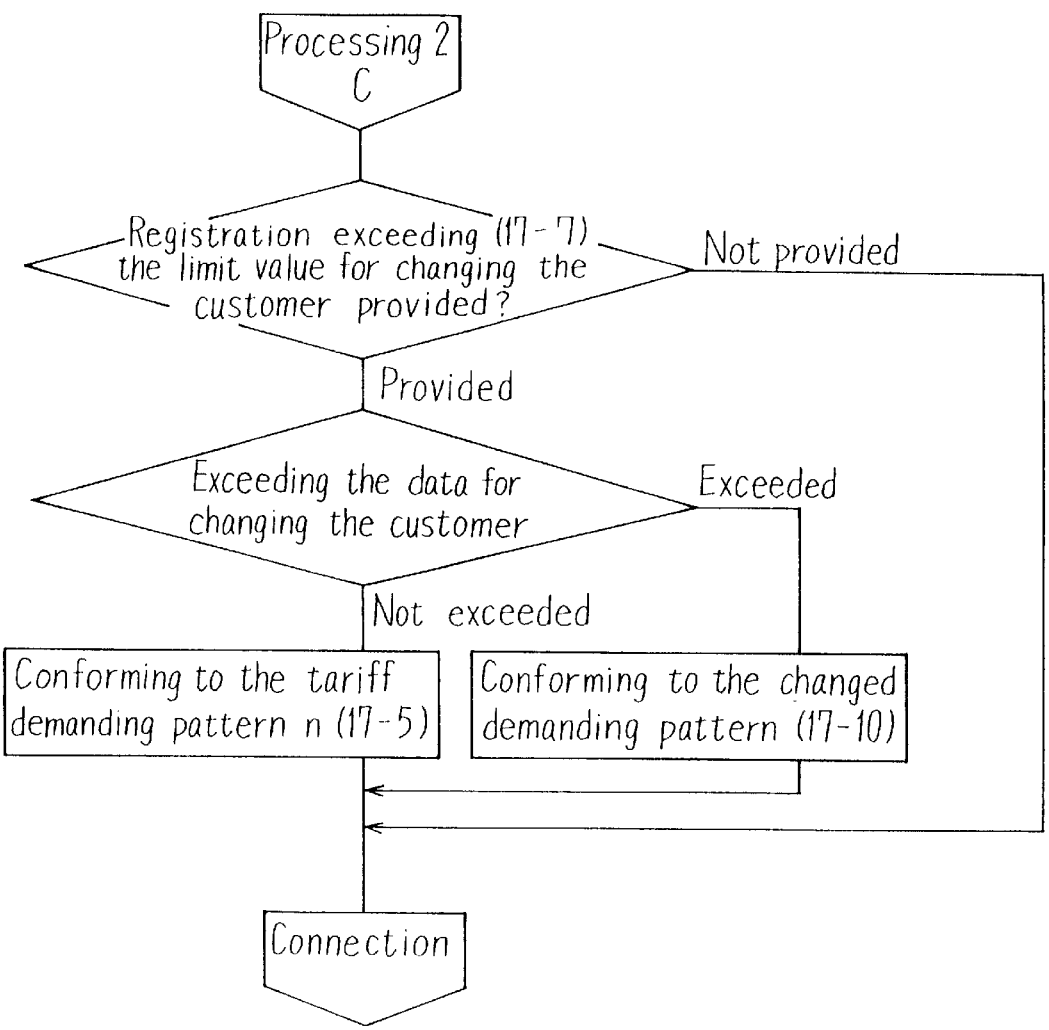

FIG. 13 and FIG. 14 illustrate examples of the control flow for executing the customer control charging. The control flow in the service control station will be explained hereunder with reference to FIG. 13 and FIG. 14.

The flexible charging control section of the service control station retrieves the customer/tariff sharing ratio determination database with the telephone number of calling subscriber received in the exchange processing used as the key.

When the telephone number of calling subscriber exists actually, it is determined whether ① previously registered designation information is used or ② the designated information inputted from the subscriber is used, depending on the contents of the data to be controlled.

In the case of ①, the customers and the tariff sharing ratio are determined depending on the contents of the data to be controlled.

In the case of ②, the customers are determined depending on the input information from a telephone set of the calling subscriber. When the calling subscriber inputs the telephone number of the customer, the customer is determined in direct.

Figure 23:
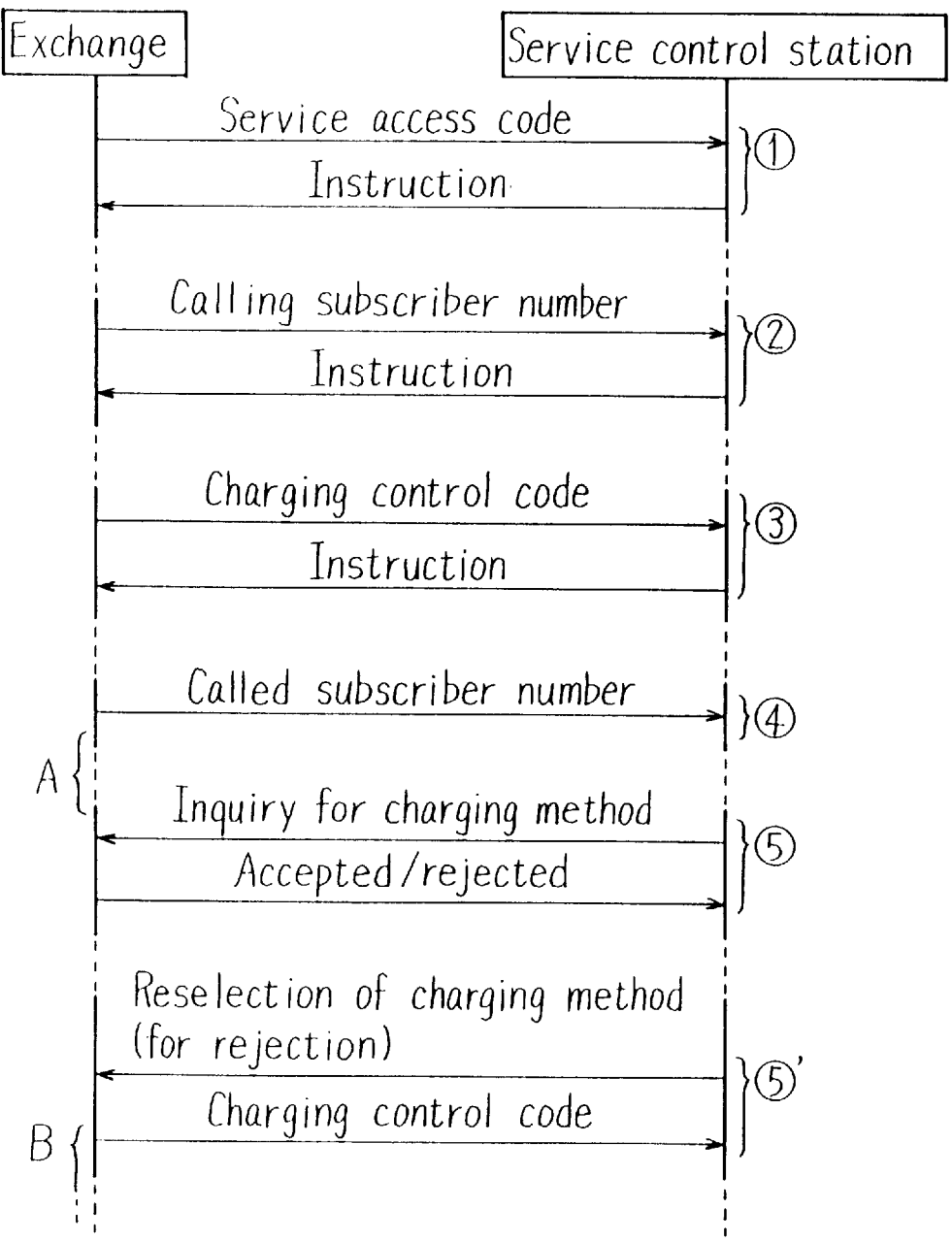
FIG. 23 is a sequence diagram for explaining the method with which a calling subscriber can input the telephone number of the customer.
Figure 24:
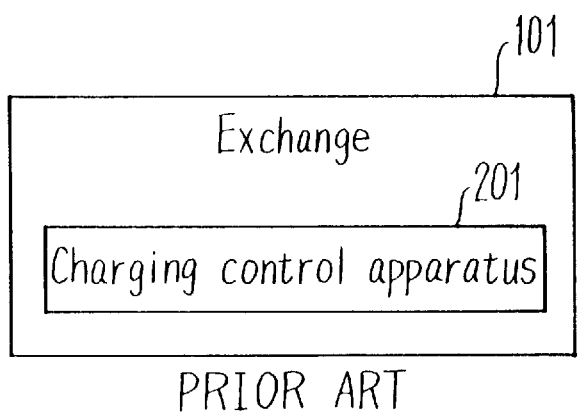
FIG. 24 is a block diagram for explaining a general charging control system introduced in the ordinary telephone network.

FIG. 23 is a sequence diagram for explaining the method with which a calling subscriber can input the telephone number of the customer. In the case where the calling subscriber inputs the telephone number of the customer, the telephone number to be inputted may be a telephone number of the third party different from the calling subscriber and the called subscriber. However, in this case, justification of the subscriber selected as the customer must be guaranteed. Therefore, it is preferable that the service control station makes inquiry, as shown in FIG. 23, to the exchange accommodating the subscriber designated as the customer in order to get some data indicating validity of the customer. If the designated subscriber is inadequate, the exchange can reject such subscriber to be designated as the customer.

In FIG. 23, the procedures from ① to ⑤ may respectively deleted and the sequence of the procedures from ① to ④ can be determined as desired.

In the procedure ⑤ explained above, when the inquiry is rejected, retrying is instructed, for example, by announcement to urge the calling subscriber to newly select again the charging method. On the contrary, when the inquiry is accepted, the communication service is offered (timing B). Such inquiry ⑤ about the charging method can also be issued before the start of communication service (timing A). Moreover, when rejection is continued for several times, it is for example announced, although it is not particularly illustrated, to forcibly release the connection of a call. The limit value of such continuous rejection may be changed freely by registering such limit value.

Meanwhile, in the case of ②, the calling subscriber may input the customer designation code as explained below.

That is, as a means for realizing the decision of customer number in the method of inputting the customer designation code by the calling subscriber, the customer number decision database (not illustrated) is provided with the customer designation code used as the key. Its output result, it is enough that the customer number is preset.

The flexible charging control section retrieves the customer number decision database with the customer designation code inputted by the calling subscriber used as the key. When the code is actually exists, the customer number is decided from the output result thereof. If the code does not exist, the customer control charging function is not offered.

On the other hand, when the telephone number of calling subscriber does not exit, the customer/tariff sharing ratio decision database is retrieved with the telephone number of the called subscriber received used as the key.

When the telephone number of called subscriber exists actually, the charging method is determined to that already registered depending on the contents of the object to be controlled.

When neither the telephone number of calling subscriber nor telephone number of the called subscriber exist, the customer control charging function is not offered (for example, the ordinary call connecting processing and charging processing are executed).

Here, registration of the charging class which indicates the priority thereof into the registration pattern of the customer/tariff sharing ratio decision database enables, after comparison of the charging class, determination of the charging method, charging information, recording method and contents of bill, depending on the registration pattern having the class of the highest priority.

With the control explained above, each subscriber can designate the detail charging method for each call.

Figure 21:
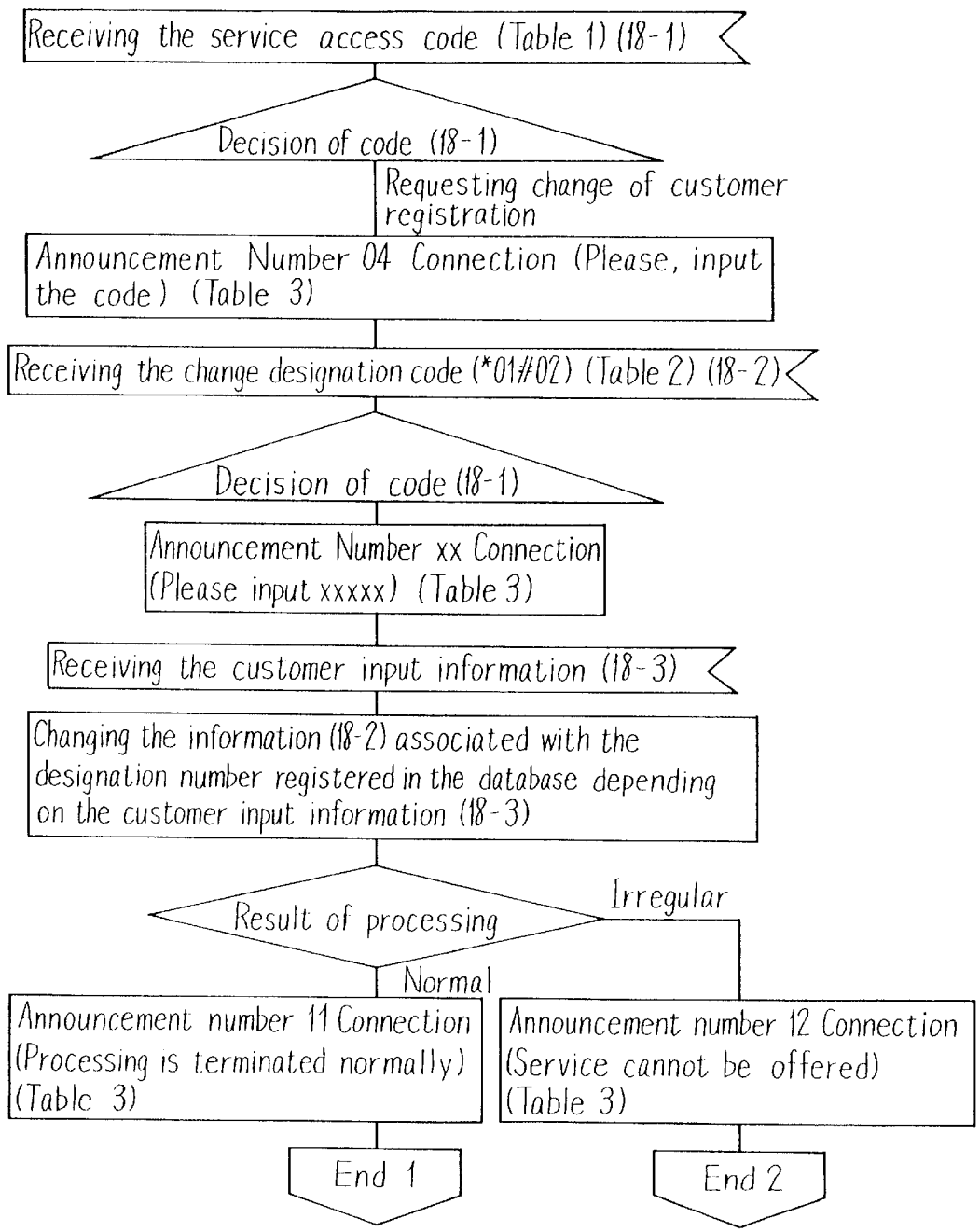
FIG. 21 illustrates an example of the control to change the contents of registration.

FIG. 21 illustrates an example of the control to change the contents of registration.

The charging method, charging information recording method and customer determination method, etc. which are already registered in any database provided in the service control station may also be changed freely with an input of the registration change codes from each subscriber terminal.

Table 2 is a list indicating an example of the registration change codes.

[TABLE 2]

List of Customer Registration Change Codes

| Customer registration change codes | Contents |
|---|---|
| *01 | Change of information associated with service access code |
| *02 | Change of information associated with the calling telephone number; |
| *03 | Change of information associated with called telephone number |
| *04 | Change of information associated with credit card number |
| *05 | Change of information associated with abbreviated dial number |
| #01 | Change of number |
| #02 | Change of priority class |
| #03 | Change of start/stop indication |
| #04 | Change of pattern |
| #05 | Change of time |

(Note): The customer registration change code is combined as *XX#XX.

The flexible charging control section of the service control station analyzes the registration change codes of table 2, for example, inputted from the subscriber with the control shown in FIG. 21 and adequately changes the subscriber designation information in the predetermined database. In this case, the service control station makes announcements listed in the table 3 to the subscribers with the speech or display.

[TABLE 3]

List of Announcement Number

| Announcement No. | Contents |
|---|---|
| 01 | Please input the credit card number. |
| 02 | Please input the secret number. |
| 03 | Please input the called telephone number. |
| 04 | Please input the code. |
| 05 | Please input the number. |
| 06 | Please input the class. |
| 07 | Please input the start/stop indication. |
| 08 | Please input the pattern change. |
| 09 | Please input the time. |
| 10 | Please input again. |
| 11 | Processing has completed normally. |
| 12 | Service cannot be offered. |

It is of course possible to freely change the charging classes already registered with an input of the codes listed in the table 2.

In regard to selection of both modes of the automatic control charging and customer control charging, it can be fixed for each of the telephone number of the calling subscriber or it may be changed as required with an input of the codes in the table 2.

The preferred embodiment of the present invention has been explained above in detail, but the present invention is not limited only to the structure disclosed in the above preferred embodiment and allows a variety of modifications without departure from the intrinsic effect thereof.

As explained above in detail, according to the present invention, there is provided a communication service control apparatus which can flexibly control the charging method before establishing the connections of a call by concentrically controlling and managing the information about charging.

We claim:

1. A communication service control apparatus for controlling the charging for tariff of communication services between subscribers, comprising:

information supply means for supplying charging control information including charging conditions about a plurality of customers for demanding said tariff of communication services;

charging decision means for deciding, based on said charging control information, to charge for a predetermined customer among said plural customers;

charging recording means for recording charging result information based on said charging decision means, wherein said information supply means has a location information for identifying accommodation location of subscribers to which said communication services are offered and charging rule information for identifying charging rules in such a case that said desired accommodation location is decided as the initial point of charging;

while said charging decision means makes reference to said location information and said charging rule information, compares the charging rules with each other based on the accommodation locations of at least two or more said subscribers among those to which said communication services are offered and decides any one of said subscribers compared as the initial point of charging to minimize a total charge according to a result of comparing said charging rules.

2. A communication service control apparatus according to claim 1 wherein said information supply means has a customer information for identifying customers predetermined corresponding to subscribers to which said communication services are offered; while said charging decision means makes reference to said customer information and decide to demand tariffs for said communication services to the predetermined customers.

3. A communication service control apparatus according to claim 1, wherein a subscriber decided as said initial point of charging is determined as a customer to whom the tariff for said communication services is demanded.

4. A communication service control apparatus according to claim 1, wherein said information supply means has a customer identifying information which is transmitted from subscribers to whom said communication services are offered to identify the customers to whom the tariffs for said communication services are demanded; and said charging decision means decides, based on said customer identifying information, to demand the tariffs for said communication services to the predetermined customers.

5. A communication service control apparatus according to claim 1, wherein said information supply means has a customer identifying information which is transmitted from subscribers to whom said communication services are offered to identify the customers to whom tariffs for said communication services are demanded and also identify sharing ratios of said tariffs; while said charging decision means demands the tariffs for said communication services to the predetermined customers in the predetermined sharing ratios based on said customer identifying information.

6. A communication service control apparatus according to claim 4, wherein said customer identifying information includes subscriber numbers of the customers.

7. A communication service control apparatus according to claim 4, wherein said customer identifying information includes credit card numbers of the customers.

8. A communication service control apparatus according to claim 4, wherein said information supply means has an established customer information for identifying predetermined customers corresponding to classes of communication services offered to said subscribers and a priority identifying information for indicating priority of any one of said established customer information and said customer identifying information; and said charging decision means makes reference to said priority identifying information to decide to demand the tariffs for said communication services to the predetermined customers.

9. A communication service control apparatus according to claim 8, comprising a priority changing means for freely changing said priority identifying information with the predetermined operations from subscribers.

10. A communication service control apparatus according to claim 1, wherein said information supply means has a rate identifying information to identify an international exchange rate; and said charging decision means makes reference to said rate identifying information to compare said charging rules with each other.

11. A communication service control apparatus according to claim 5, wherein said customer identifying includes subscriber numbers of the customers.

12. A communication service control apparatus according to claim 5, wherein said customer identifying information includes credit card numbers of the customers.

* * * * *